United States Patent
Kim (10) Patent No.: US 9,338,270 B2
(45) Date of Patent: May 10, 2016

(54) MOBILE TERMINAL

(75) Inventor: Young-Joong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1246 days.

(21) Appl. No.: 12/479,141

(22) Filed: Jun. 5, 2009

(65) Prior Publication Data

US 2009/0315846 A1 Dec. 24, 2009

(30) Foreign Application Priority Data

Jun. 19, 2008 (KR) .......................... 10-2008-0058063

(51) Int. Cl.
*G06F 3/041* (2006.01)
*H04M 1/23* (2006.01)
*F21V 8/00* (2006.01)
*H04M 1/02* (2006.01)
*H04M 1/22* (2006.01)

(52) U.S. Cl.
CPC ............... *H04M 1/23* (2013.01); *G02B 6/0076* (2013.01); *H04M 1/0235* (2013.01); *H01H 2219/052* (2013.01); *H01H 2219/056* (2013.01); *H01H 2219/062* (2013.01); *H01H 2219/064* (2013.01); *H01H 2231/022* (2013.01); *H04M 1/22* (2013.01); *H04M 2250/16* (2013.01); *H04M 2250/18* (2013.01); *H04M 2250/22* (2013.01)

(58) Field of Classification Search
USPC .......... 345/173–178; 178/18.01–18.09, 19.11
See application file for complete search history.

(56) References Cited

U.S. PATENT DOCUMENTS

| | | | |
|---|---|---|---|
| 4,078,257 A | 3/1978 | Bagley | |
| 6,992,672 B1 * | 1/2006 | Niikawa et al. | 345/530 |
| 7,224,945 B2 * | 5/2007 | Gartrell | 455/90.3 |
| 2005/0130720 A1 * | 6/2005 | Finke-Anlauff | 455/575.3 |
| 2005/0172242 A1 * | 8/2005 | Vienneau et al. | 715/801 |
| 2005/0187016 A1 * | 8/2005 | Fukui et al. | 463/32 |
| 2006/0146035 A1 * | 7/2006 | Cha et al. | 345/173 |
| 2007/0105604 A1 | 5/2007 | Choo et al. | |
| 2007/0147087 A1 * | 6/2007 | Parker et al. | 362/615 |
| 2007/0205088 A1 | 9/2007 | Lee et al. | |
| 2007/0273671 A1 * | 11/2007 | Zadesky et al. | 345/173 |
| 2008/0036691 A1 * | 2/2008 | Yamada et al. | 345/1.1 |
| 2008/0088597 A1 * | 4/2008 | Prest et al. | 345/173 |
| 2008/0117635 A1 | 5/2008 | Chen | |
| 2008/0150903 A1 * | 6/2008 | Chuang | 345/173 |
| 2009/0180282 A1 * | 7/2009 | Aylward et al. | 362/245 |
| 2009/0322690 A1 * | 12/2009 | Hiltunen et al. | 345/173 |
| 2010/0259485 A1 * | 10/2010 | Chuang | 345/173 |
| 2012/0235949 A1 * | 9/2012 | Ligtenberg | 345/174 |

FOREIGN PATENT DOCUMENTS

| | | |
|---|---|---|
| EP | 1761002 A1 | 3/2007 |
| KR | 10-0652755 B1 | 12/2006 |
| KR | 10-0664275 B1 | 1/2007 |

* cited by examiner

*Primary Examiner* — Ilana Spar
*Assistant Examiner* — Jeffrey S Steinberg
(74) *Attorney, Agent, or Firm* — Birch, Stewart, Kolasch & Birch, LLP (57) ABSTRACT

A mobile terminal including a first display unit configured to display first information for selecting a first key function, a second display unit configured to display second information for selecting a second key function, in which the second display unit is disposed to overlap with one surface of the first display unit, a touch input unit configured to receive a touch input for receiving an instruction for selecting the first or the second key function upon activation of the first or second key display unit, and a controller configured to control the second display unit to display the second information upon deactivation of the first display unit.

21 Claims, 12 Drawing Sheets

MOBILE TERMINAL

CROSS-REFERENCE TO A RELATED APPLICATION

The present application claims priority to Korean Application No. 10-2008-0058063, filed in Korea on Jun. 19, 2008, which is herein expressly incorporated by reference in its entirety.

BACKGROUND OF THE INVENTION

1. Field of the Invention

The present invention relates to a mobile terminal having a keypad assembly for inputting key information.

2. Background of the Invention

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

In addition, the mobile terminal generally is small in size and thus uses a graphical user interface (GUI) to allow the user to search through different menu options provided on the terminal. Many users also consider their mobile terminal to be a personal necessity and also one that reflects their personality. Thus, there is an increasing demand to purchase mobile terminals that are slim and small in size. However, as the mobile terminal is becoming smaller and slimmer, the user interface is becoming more and more difficult to operate.

SUMMARY OF THE INVENTION

Accordingly, one object of the present invention is to address the above-noted and other problems.

Another object of the present invention is to provide a mobile terminal having a keypad assembly for selectively displaying a plurality of key information on a single display region.

To achieve these and other advantages and in accordance with the purpose of the present invention, as embodied and broadly described herein, the present invention provides in one aspect a mobile terminal including a first display unit configured to display first information for selecting a first key function, a second display unit configured to display second information for selecting a second key function, in which the second display unit is disposed to overlap with one surface of the first display unit, a touch input unit configured to receive a touch input for receiving an instruction for selecting the first or the second key function upon activation of the first or second key display unit, and a controller configured to control the second display unit to display the second information upon deactivation of the first display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal according to an embodiment of the present invention will be described in detail with reference to the accompanying drawings.

Figure 1:
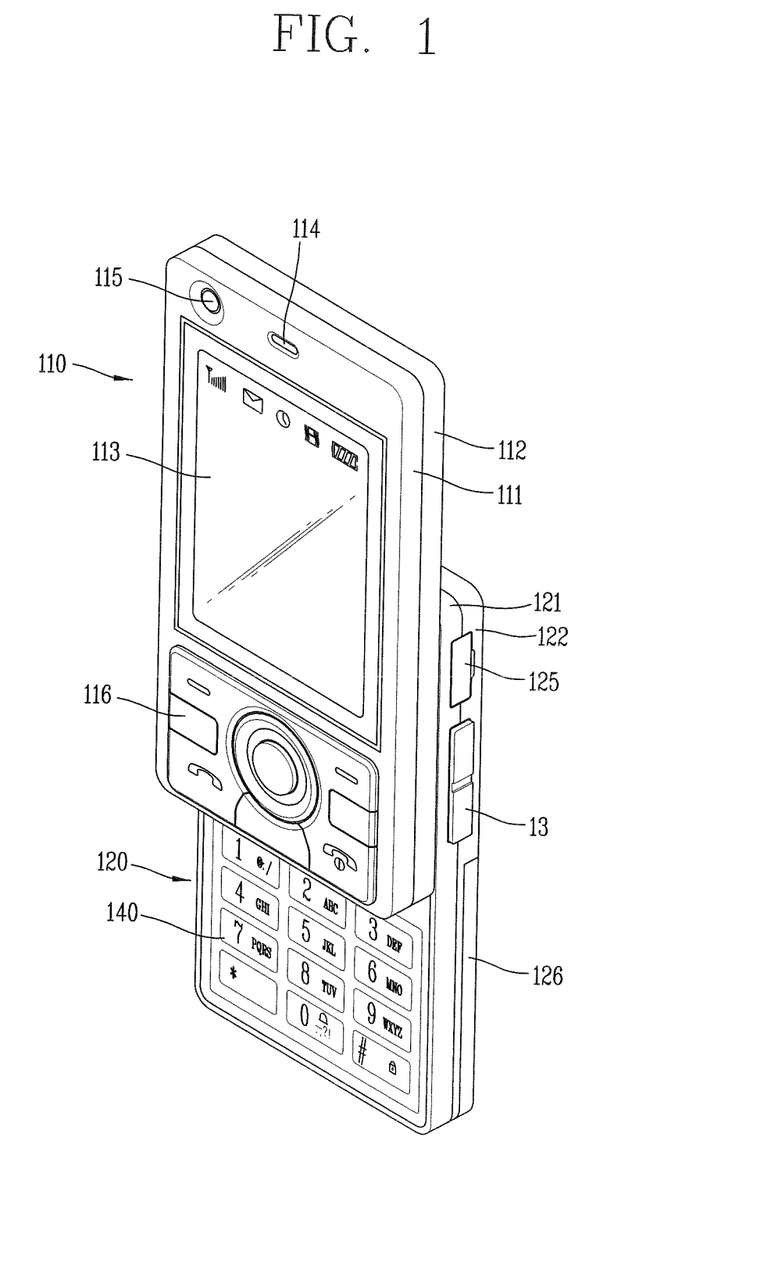
FIG. 1 is a front perspective view of a mobile terminal according to an embodiment of the present invention.

FIG. 1 is a front perspective view illustrating one example of a mobile terminal according to an embodiment of the present invention. As shown, the mobile terminal includes a first body 110 and a second body 120 formed to be slidably moved along at least one direction on the first body 110. In addition, the first body 110 being disposed to overlap with the second body 120 will be referred to as a closed configuration, and as shown in FIG. 1, the first body 110 being opened from and exposing at least a portion of the second body 120 will be referred to as an opened configuration.

In the closed configuration, the mobile terminal may operate in a standby mode. Further, the standby mode can be released according to a user manipulation. The mobile terminal also operates mainly in a calling mode or the like in the opened configuration, and can be changed to the standby mode according to a user manipulation or with the lapse of a certain time. In addition, the case (also referred to as a casing, a housing, a cover, or the like) forming the external appearance of the first body 110 includes a front case 111 and a rear case 112. Various electronic components are installed in the space between the front case 111 and the rear case 112.

In addition, one or more intermediate cases may be disposed between the front case 111 and the rear case 112. The cases may also be formed by injection-molding a synthetic resin or may be made of a metallic material, e.g., stainless steel (STS) or titanium (Ti), or the like. Also, as shown in FIG. 1, on the first body 110, substantially on the first front case 111, a display unit 113, a first audio output unit 114, a first image input unit 115, and a first manipulating unit 116 are disposed.

In addition, the display unit 113 can include an LCD (Liquid Crystal Display) module or an OLED (Organic Light Emitting Diode) module or the like that visually displays information. The display unit 113 may further include a touch screen to allow inputting of information in a touch manner by the user. Further, the audio output unit 114 may be implemented as a receiver or a speaker, and the first image input unit 115 may be implemented in the form of a camera module for capturing an image or video of the user, and so on.

In addition, the first manipulating unit 116 is configured to receive commands for controlling an operation of the mobile terminal according to one embodiment of the present invention. Also, similar to the first body 110, the case of the second body 120 is formed by a front case 121 and a rear case 122. A keypad assembly 140 is also disposed on the second body 120, specifically, on a front face of the front case 121.

Further, a second manipulation unit 123, a second audio input unit 124 (shown in FIG. 3), and an interface 125 are disposed on at least one of the front case 121 and the rear case 122. The first and second manipulating units 116 and 123 are also generally referred to as a manipulating portion, and any manipulating mechanism can be used and be operated in a tactile manner. For example, the manipulating units may be implemented as a dome switch, a touch pad, a wheel or jog type for rotating a key, or a joystick, etc, that can receive a command or information according to a pressing or a touch operation by the user.

In addition, the first manipulating unit 116 can be used to input a command such as a start command, end or scroll command, etc., and the second manipulating unit 123 can be operated as a hot key for performing a special function such as activating the first image input unit 115. Further, the audio input unit 124 may be implemented in the form of, for example, a microphone to receive a voice of the user or other sounds, etc.

Also, the interface 125 may be used as a passage allowing the mobile terminal to exchange data with an external device. For example, the interface 125 may be at least one of a connection port to be connected with an earphone through a fixed line or wirelessly, a port for short range communication (e.g., an IrDA port, a wireless LAN port, BLUETOOTH, etc.), and a power supply port for supplying power to the mobile terminal. The interface 125 may also be a card socket for receiving/accommodating an external card such as a Subscriber Identification Module (SIM), a User Identity Module (UIM), a memory card for storing information, or the like. In addition, a power supply unit 126 is mounted at the side of the rear case 122 to supply power to the mobile terminal. The power supply unit 126 may be, for example, a rechargeable battery which can be detachable to allow for charging.

Figure 2:
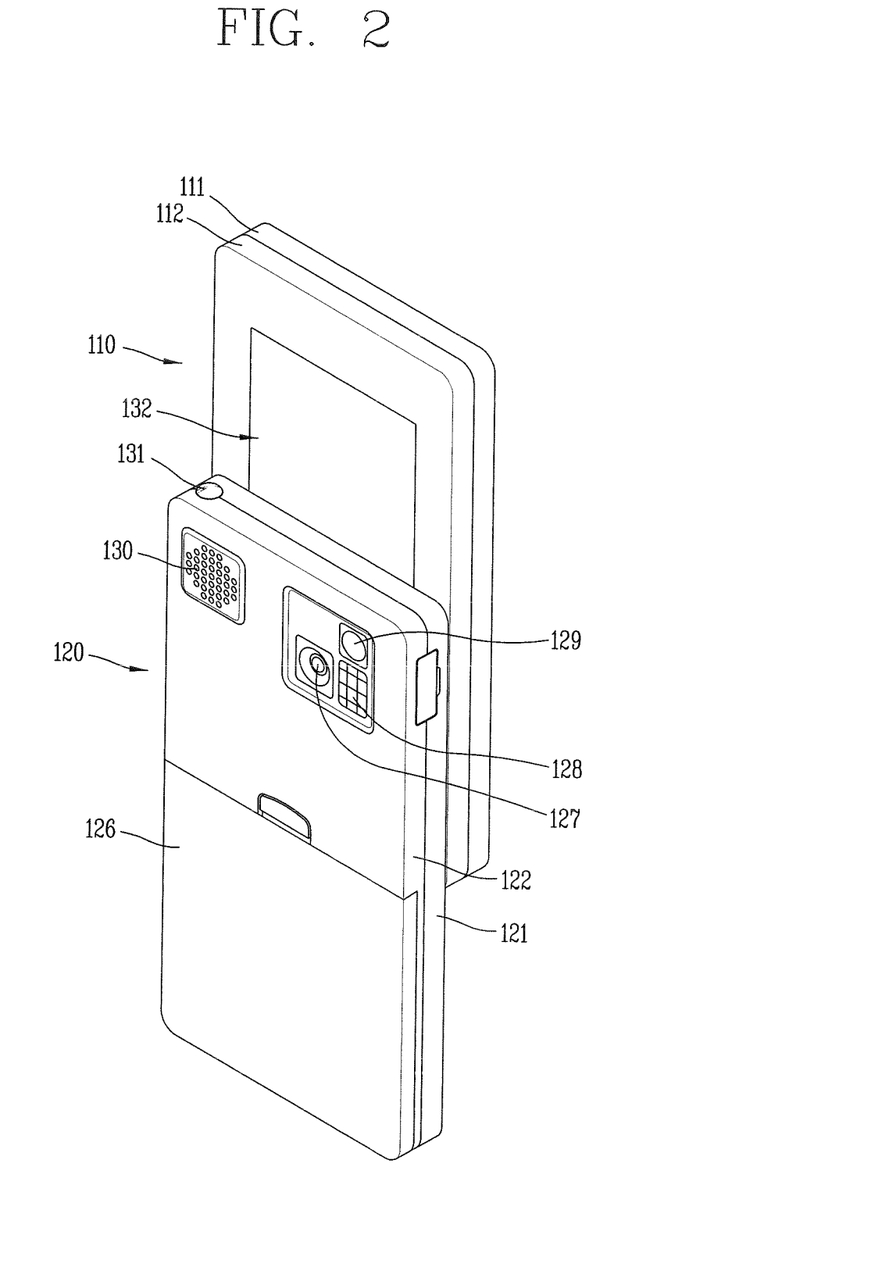
FIG. 2 is a rear perspective view of the mobile terminal shown in FIG. 1.

Next, FIG. 2 is a rear perspective view of the mobile terminal shown in FIG. 1. As shown, a second image input unit 127 is mounted on the rear surface of the rear case 122 of the second body 120. The second image input unit 127 also has an image capture direction which is substantially the opposite to that of the first image input unit 115 (see FIG. 1), and may have a different number of pixels from that of the first image input unit 115. For example, the first image input unit 115 may operate with a relatively lower resolution to capture an image of the user and transmit the same to the another party during video call communication or the like, while the second image input unit 127 may operate with a relatively higher resolution to capture a general subject with a high picture quality, which may not need to be immediately transmitted.

A flash 128 and a mirror unit 129 are also disposed adjacent to the second image input unit 127. In addition, when an image of the subject is captured with the second image input unit 127, the flash 128 illuminates the subject, and the mirror unit 129 allows the user to see himself when he wants to capture his own image using the second image input unit 127. A second audio output unit 130 may also be disposed on the rear case 122, and implement a stereophonic function in conjunction with the first audio output unit 114 (see FIG. 1), and may be used for a call in a speaker phone mode.

Further, a broadcast signal reception antenna 131 is disposed at one side of the rear case 122, in addition to an antenna used for call communication. The antenna 131 may be installed such that it can be retracted from the second body 120. Also, one part of a slide module 132 that slidably connects the first body 110 to the second body 120 is located on the rear case 112 of the first body 110. The other part of the slide module 132 is located on the front case 121 of the second body 120, which may not be exposed, as shown in FIG. 2.

While the above description describes the second image input unit 127 and the like as being on the second body 120, the present invention is not limited to the configuration shown. For example, one or more of the elements 127 to 131, which are disposed on the rear case 122 may be mounted on the first body 110, mainly, on the rear case 112. In this instance, the elements disposed on the rear case 112 can be protected by the second body 120 in the closed configuration. In addition, even if the second image input unit 127 is not provided, the first image input unit 115 may be configured to rotate to allow image capturing even in the image capturing direction of the second image input unit 127.

Figure 3:
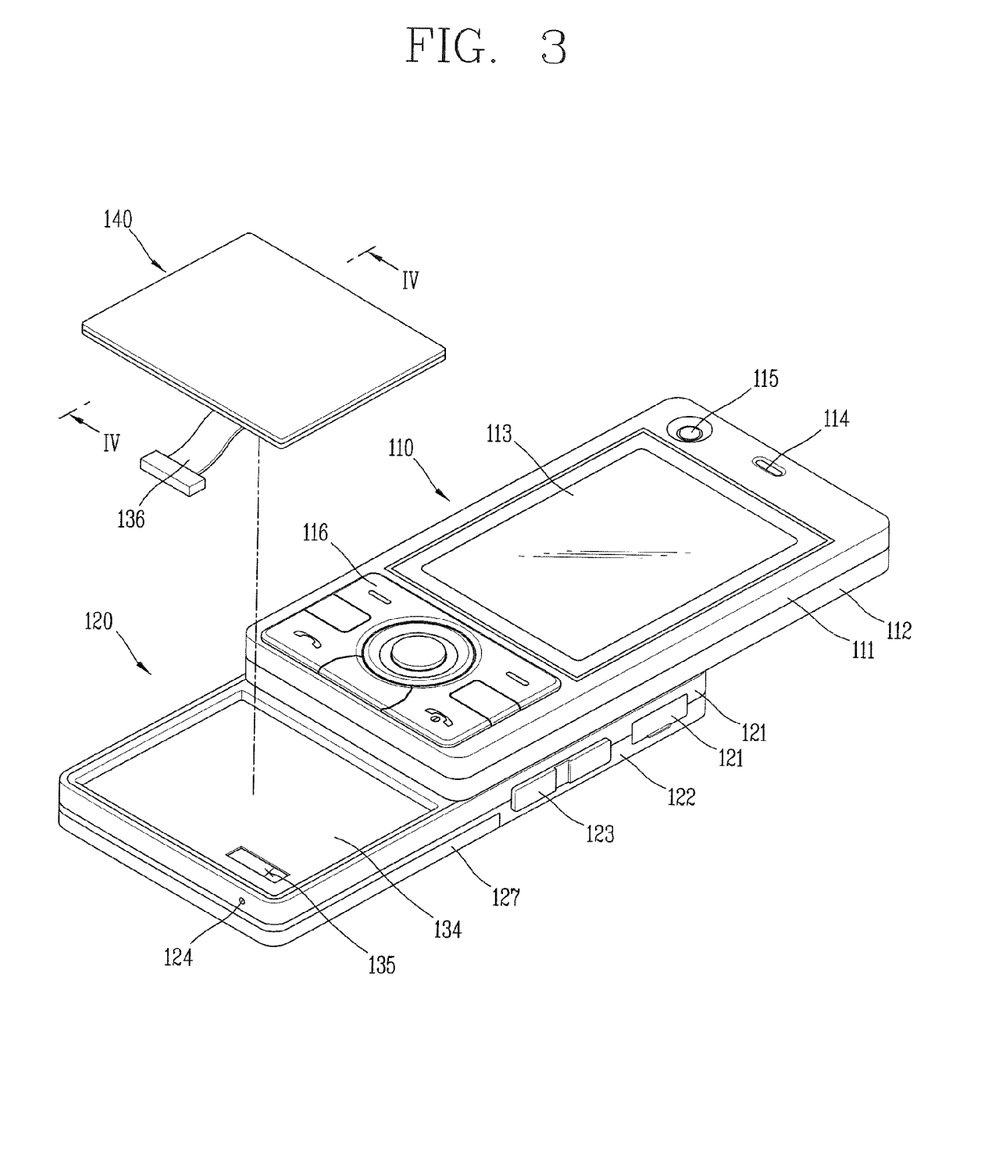
FIG. 3 is an exploded perspective view of the mobile terminal shown in FIGS. 1 and 2 according to an embodiment of the present invention.
Figure 4:
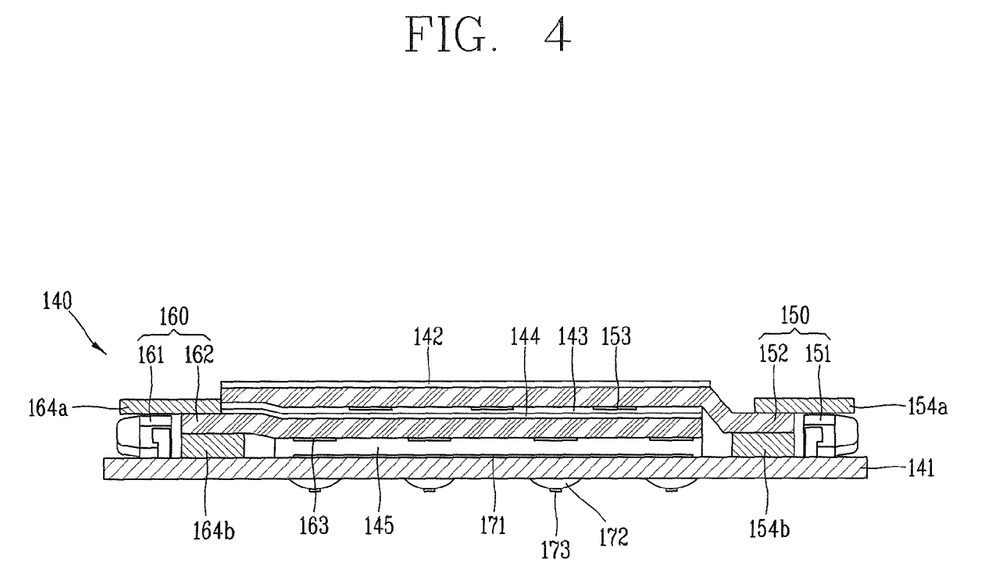
FIG. 4 is a cross sectional view of a keypad assembly taken along line IV-IV of FIG. 3.

Next, FIG. 3 is an exploded perspective view of the mobile terminal according to an embodiment of the present invention, and FIG. 4 is a cross sectional view of a keypad assembly taken along the line IV-IV of FIG. 3. Further, in FIG. 4, the elements of the keypad assembly are exaggerated for clarity. Referring to FIG. 3, a mounting groove 134 is formed on the front case 121 of the second body 120, and a keypad assembly 140 is installed on the mounting groove 134. Further, a flexible printed circuit board (FPCB) 136 is connected to one side of the keypad assembly 140, and one end of the flexible printed circuit board 136 is connected to a printed circuit board installed in the second body 120 via a connector hole 135 formed on the mounting groove 134. FIG. 3 also illustrates some of the components described in FIGS. 1 and 2.

Figure 5A:
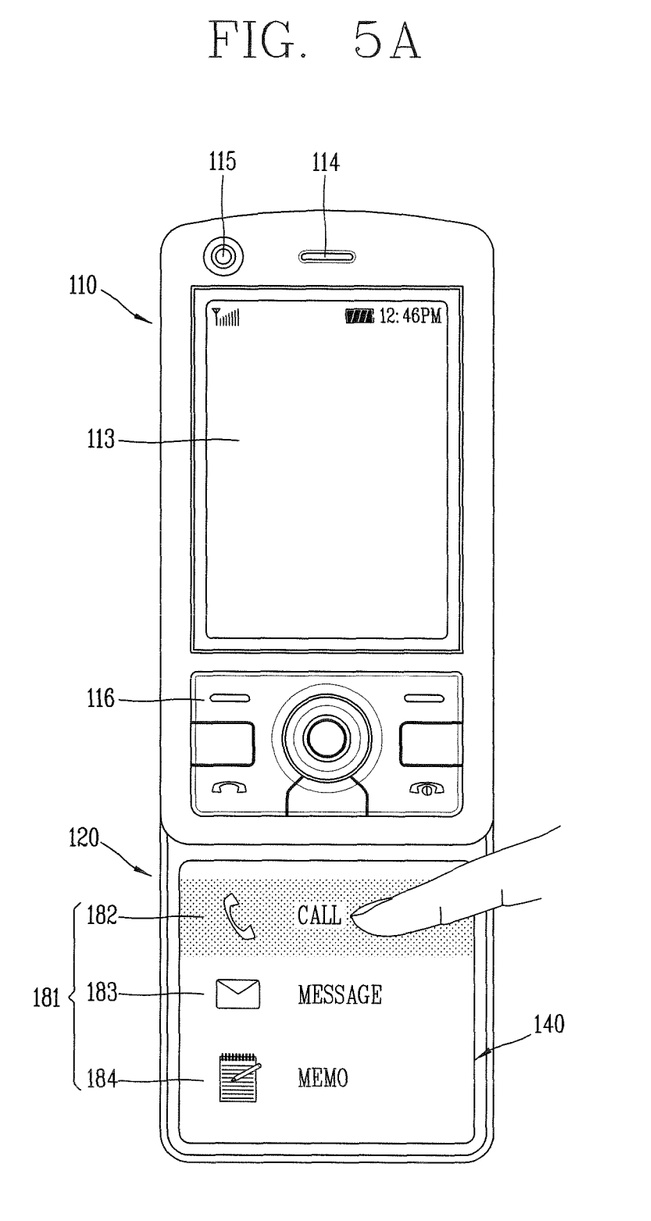
FIGS. 5A to 5D are front perspective views showing an operational state of a mobile terminal according to an embodiment of the present invention.

Referring to FIG. 4, the keypad assembly 140 includes a first display unit 150, a second display unit 160, and a touch input unit 171. The keypad assembly 140 is also mounted on the printed circuit substrate 141. In addition, as shown in FIG. 5A, the first display unit 150 displays first information 181 for selecting a first key function. In FIG. 4, the first display unit 150 includes a first light emitting device 151 and a first light guide film 152. Further, the first light emitting device 151 is mounted at one side of the printed circuit board 141, and is configured to emit light toward one direction. An LED (light emitting diode) may be used as the first light emitting device 151, and is disposed to emit light in a direction parallel to the front surface of the printed circuit board 141.

Also, referring to FIG. 4, a first print pattern 153 is provided on one surface of the first light guide film 152, and may be formed with fluorescent ink that emits light by the light of the first light emitting device 151. The first light guide film 152 also guides the light of the first light emitting device 151 to the first print pattern 153, and the first print pattern 153 displays first information 181 by the light guided by the first light guide film 152. In this embodiment, the first print pattern 153 is printed on the rear surface of the first light guide film 152, and a protective layer 142 for physically and chemically protecting the first light guide film 152 is disposed on the front surface of the first light guide film 152.

In addition, as shown in FIG. 4, the second display unit 160 is disposed to overlap with one surface of the first display unit 150, and is configured to display second information 185 (see FIGS. 5B and 5C) for selecting a second key function. The second information 185 can also be displayed on a display region of the first information 181 upon deactivation of the first display unit 150. Similar to the first information unit 150, the second display unit 160 includes a second light emitting device 161 and a second light guide film 162. In addition, the second light emitting device 161 may be mounted on the other side of the printed circuit board 141, and like the first light emitting device 151, an LED (light emitting diode) may be used as the second light emitting device 161.

Further, the second light emitting device 161 is disposed to emit light toward a direction different from that of the first light emitting device 151. For example, the second light emitting device 161 may be disposed to emit light toward a direction opposite to the light emitting direction of the first light emitting device 151. In addition, the second light guide film 162 is disposed on the rear surface of the first light guide film 152, and a second print pattern 163 is provided at one surface of the second light guide film 162. The second print pattern 163 may also be formed with fluorescent ink like the first print pattern 153, or may be formed to have a different color from that of the first print pattern 153. The second light guide film 162 may also be attached to the front surface of the printed circuit board 141 by an adhesive 145.

Further, the light coming from the second light emitting device 161 when the first light emitting device 151 is in an deactivated state reaches the second print pattern 163 through the second light guide film 162, and the second print pattern 163 displays the second information 185 by the light guided by the second light guide film 162. The first and second light emitting devices 151 and 161 may also be installed at a plurality of locations on the printed circuit board 141, and the second light emitting device 161 may have a higher brightness than the first light emitting device 151 or may be installed at a larger number of locations than the first light emitting device 151.

In addition, light blocking members can be mounted on the first and second light emitting devices 151 and 161 to allow the light generated in the first and second light emitting devices 151 and 161 to only reach the first and second light guide films 152 and 162. For example, as shown in FIG. 4, light blocking members include first and second light guiding members 154a and 154b to be mounted around the first light emitting device 151, and third and fourth light emitting members 164a and 164b to be mounted around the second light emitting device 161. The light blocking members may be formed of a tape made of a non-translucent material.

In the embodiment shown in FIG. 4, a deposition layer 143 is also formed on the rear surface of the first light guide film 152, and is used to reduce the luminance of light emitted from the second print pattern 163. That is, the deposition layer 143 prevents the first print pattern 153 from being displayed by the light emitted from the second print pattern 163 by reducing the luminance of the light emitted from the second print pattern 163. The deposition layer 143 can also be formed by depositing a material having a low light transmittance on the rear surface of the first light guide film 152.

Further, a diffusion layer 144 for diffusing the light of the second print pattern 163 is also provided on the rear surface of the deposition layer 143. The diffusion layer 144 is used to minimize the light of the second print pattern 163 being concentrated on the first print pattern 153. Thus, the deposition layer 143 and the diffusion layer 144 can prevent the first print pattern 153 from displaying the first information 181 by the light of the second print pattern 163 upon activation of the second display unit 160.

In addition, the touch input unit 171 receives a touch input for receiving an instruction for selecting the first or the second key function upon activation of the first or second key display units 150 and 160. In more detail, the touch input unit 171 is configured to receive an instruction for activating the first or second key function by touching the first or second information 181 and 185. The following description will be given based on the touch input unit 171 receives a touch input applied to the first information 181.

As shown in FIG. 4, the touch input unit 171 is mounted on the printed circuit board 141, and more specifically, on the front surface of the printed circuit board 141. The touch input unit 171 may also be disposed in plural number at a location corresponding to the location of the first print pattern 143. The touch input unit 171 may also be in the form of a pressure sensor or a touch sensor, and the touch sensor may be implemented by an electrostatic capacitance method.

In addition, as shown in FIG. 4, the key input unit includes a switch unit 172 for receiving a push on the first information 181 or second information 185 by deformation. That is, the switch unit 172 may be configured to receive a push on the second information 185 upon activation of the second display unit 160. In the embodiment shown in FIG. 4, the switch unit 172 is disposed on the rear surface of the touch input unit 171 and receives a push by deformation. The switch unit 172 is also implemented in the form of a dome switch 172.

Thus, when the user pushes, touches or presses the second information 185, the first and second light guide films 152 and 162 deform at corresponding regions of the printed circuit board 141, and thus contacts are established between ends of the dome switch and the printed circuit board 141. Accordingly, the contacts formed on the rear surface of the printed circuit board 141 are electrically connected to generate an input signal. A support member 173 for supporting the dome switch 172 is also mounted on the dome switch 172, and the printed circuit board 141 is a flexible printed circuit board (FPCB) so that pushed regions may be easily deformed.

In addition, the switch unit 172 may be configured to receive a push action applied to the first information 181 upon activation of the first display unit 150. That is, the switch unit 172 may be configured to receive a push operation according to the touch input. Further, the keypad assembly 140 may be configured to input the first information by manipulating the corresponding information by a combination of a touching and pushing action. In another embodiment, the touch input unit 171 can receive a touch applied on the second information 185 upon activation of the second display unit 160.

Next, FIGS. 5A-5D are front overviews showing an operational state of the mobile terminal according to an embodiment of the present invention. As shown in FIG. 5A, the first display unit 150 is configured to be activated when the mobile terminal is switched from a closed state to an opened state. That is, when the mobile terminal is switched from a closed state to an open state, the first light emitting device 151 is activated to display the first information 181 by the first print pattern 153.

In FIG. 5A, the first information 181 includes a plurality of icons 182 to 184 representing selectable operation modes such as a phone mode, a text message mode, a typing mode, a music listening or video watching mode, a camera mode, etc. In this embodiment, the three modes include a phone mode related to a phone icon 182, a text message mode related to a text message icon 183, and a typing mode related to a memo icon 184. Thus, when the user touches any one of the icons, the touch input unit 171 detects this touch and the second display unit 160 displays the second information 185 corresponding to the operation mode.

Figure 5B:
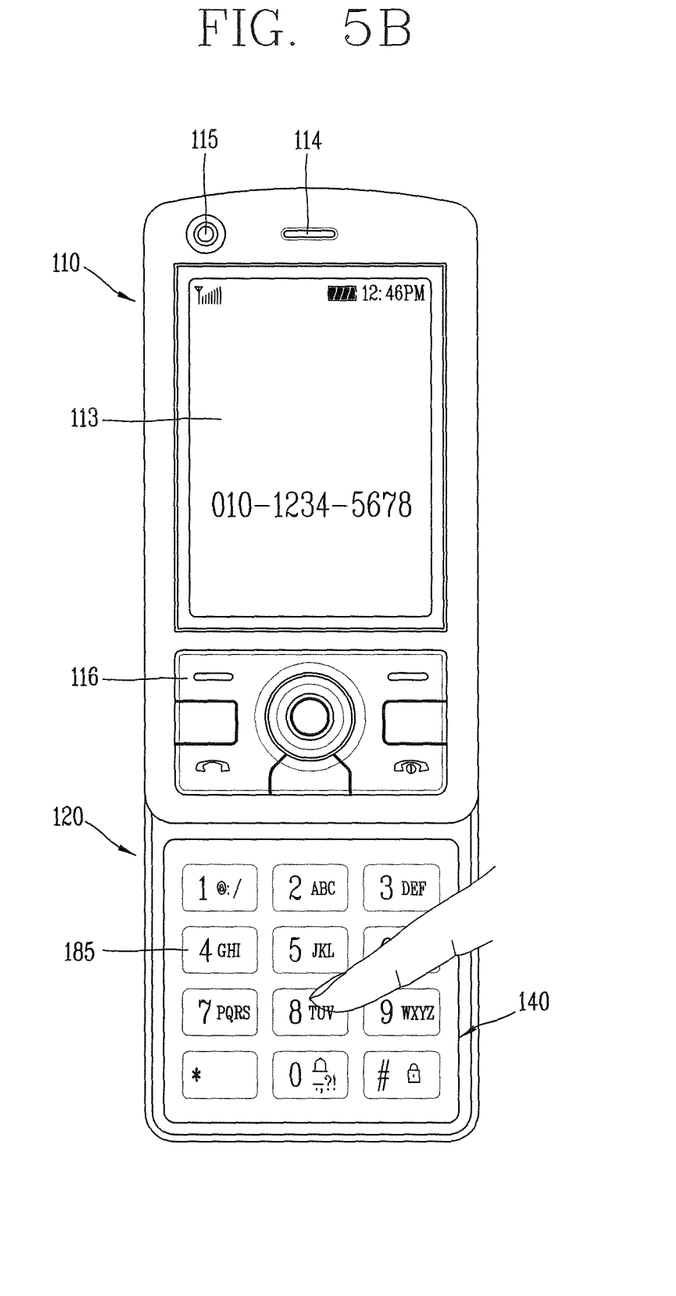

In particular, as shown in FIG. 5B, when the user touches the phone icon 182 representing the phone mode, the second display unit 160 displays the second information 185. In this instance, the first light emitting device 151 is deactivated, and the second light emitting device 161 is activated to display the second information 185 by the second print pattern 163. Further, the second information 185 may include visual information representing numbers, characters, symbols and so forth arranged in plural number, and the corresponding information may be input by touching and/or pushing on the second information 185. Thus, if the user touches and/or pushes particular numbers on the touchscreen to dial a telephone number, the corresponding signal is applied to the mobile terminal by deformation of the dome switch 172. Then, as shown in FIG. 5B, the corresponding telephone number is displayed on the display unit 113.

Figure 5C:
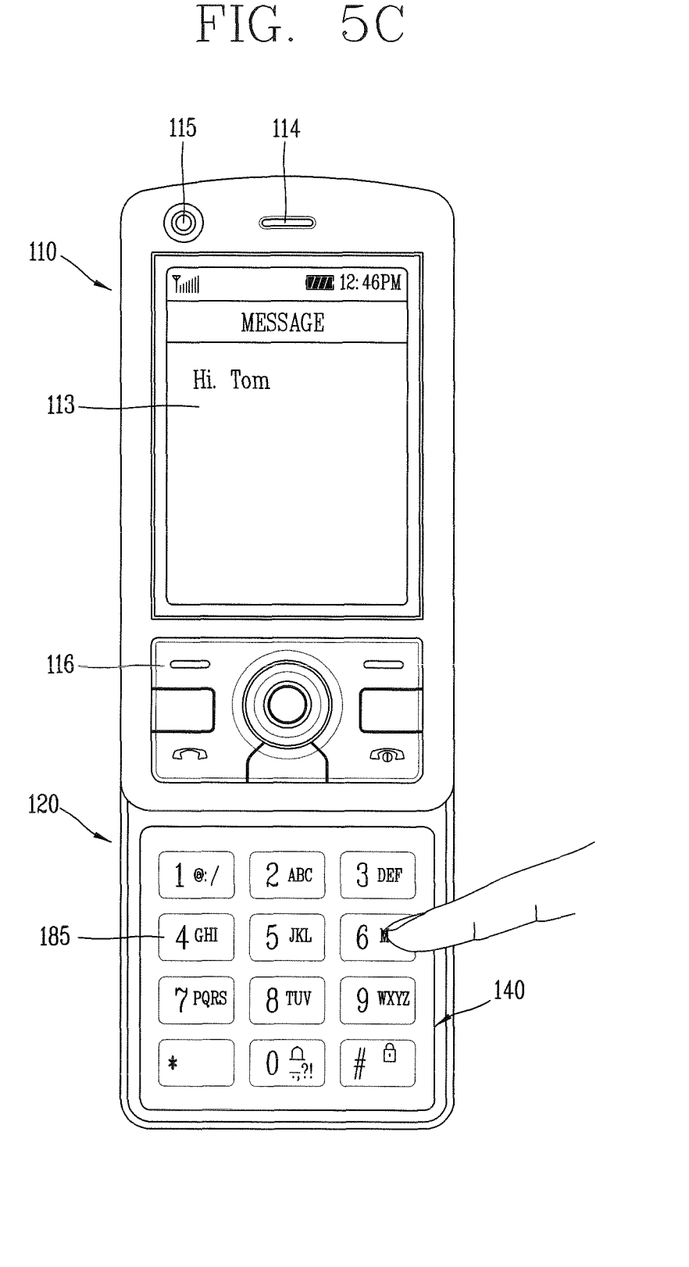
Figure 5D:
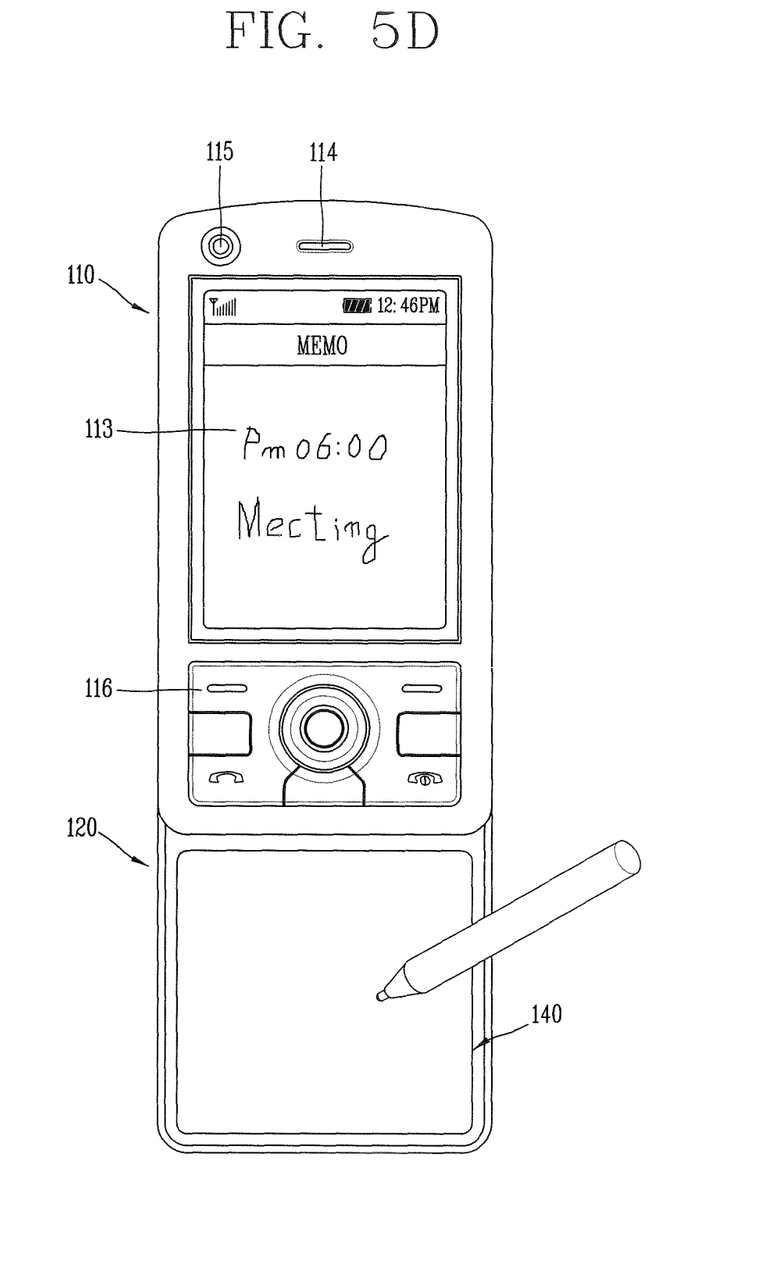

Next, as shown in FIG. 5C, when the user selects the message icon 183 representing the text message mode shown in FIG. 5A, the second display unit 160 is activated to display the second information 185. In this instance, the user can input a character, a symbol, or the like desired to be transmitted to the other party by pushing the second information 185. As shown in FIG. 5D, when the user touches the memo icon 184 representing the typing mode, the first and second display units 150 and 160 are deactivated. That is, the first and second light emitting devices 151 and 161 are controlled such that no light is produced in the typing mode, and accordingly the first and second display units 150 and 160 do not display the first and second information 181 and 185.

Thus, as shown in FIG. 5D, When the user touches on the front surface of the first display unit 150 with a finger or a stylus pen, the touch input unit 171 detects this touch and the contents input to the touch input unit 171 are displayed on the display unit 113. Therefore, the user can create a memo on the mobile terminal.

Figure 6:
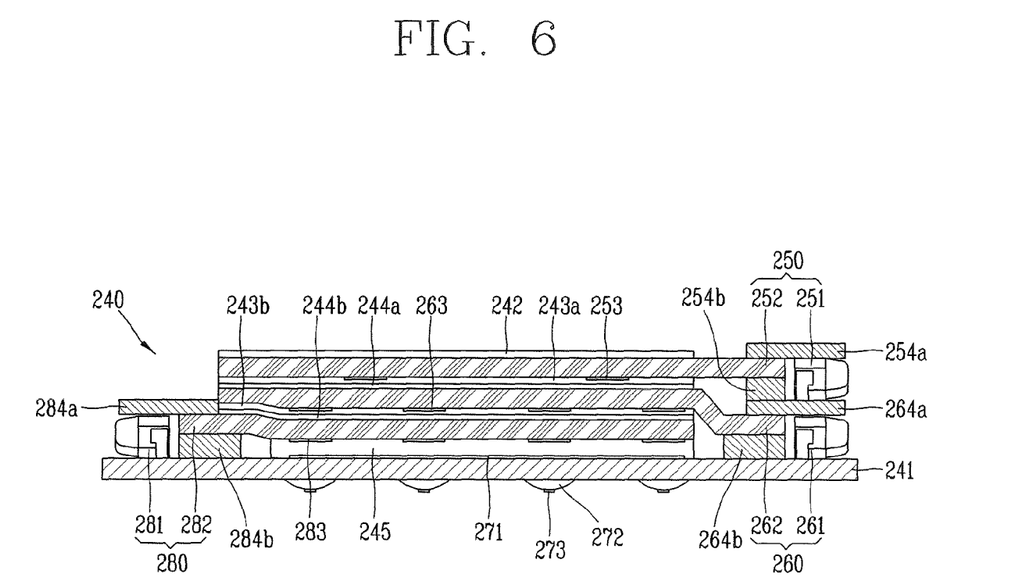
FIG. 6 is a cross sectional view of a keypad assembly according to an embodiment of the present invention.

Next, FIG. 6 is a cross sectional view of a keypad assembly 240 according to another embodiment of the present invention. Similar elements as those in FIG. 6 are designated by similar reference numerals, except the reference numerals are increased by 100. As shown in FIG. 6, the keypad assembly 240 according to this embodiment includes first to third key display units 250, 260 and 280. In addition, the first display unit 250 includes a first light emitting device 251 and a first light guide film 252 printed with a first print pattern 253, and the second display unit 260 includes a second light emitting device 261 and a second light guide film 262 printed with a second print pattern 263. Further, the third key display unit 280 includes a third light emitting device 281 and a third light guide film 282 printed with a third print pattern 283.

In addition, first and second deposition layers 243a and 243b and first and second diffusion layers 244a and 244b are respectively mounted on the rear surface of the first and second light guide films 252 and 262, and light blocking members 254a, 254b, 264a, 264b, 284a and 284b are respectively mounted around the first to third light emitting devices 251, 261 and 281. The configurations of the first to third light emitting devices 251, 261 and 281, the first to third light guide films 252, 262 and 282, a touch input unit 271, and a switch unit 272 are the same as the configuration of the keypad assembly 140 according to the previous embodiment.

In the keypad assembly 240 according to this embodiment, as any one of the first to third light emitting devices 251, 261 and 281 selectively emits light, key information is displayed by any one of the first to third print patterns 253, 263 and 283. The keypad assembly 240 is also configured to display input information in accordance with the manipulation of third key information upon activation of the third display unit 280. In more detail, if the first display unit 250 displays first information, the touch input unit 271 may receive a touch input applied to the first information, and if the second display unit 260 displays second information or the third key display unit 280 displays third information, the switch unit 272 may input information by a push applied to the second or third key information.

In addition to the above-stated configuration, the touch input unit 271 and the switch unit 272 may be configured to selectively receive a touch or push input on the first to third key display units 250, 260 and 280. For example, if the touch input unit 271 is configured to receive a touch applied to the first or second information, the switch unit 272 may be configured to receive a push applied to the third key information.

Figure 7A:
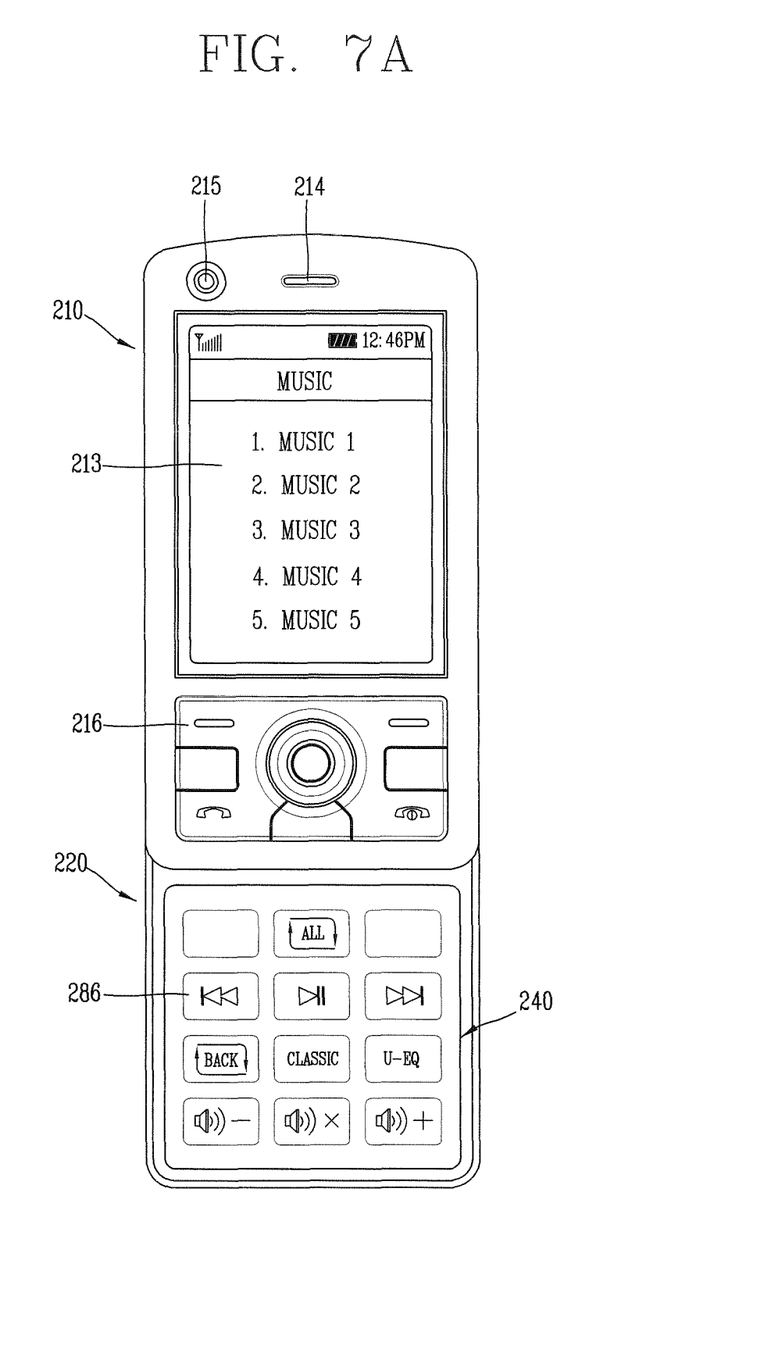
FIGS. 7A and 7B are front perspective views showing an operational state of a mobile terminal according to another embodiment of the present invention.

Next, FIGS. 7A and 7B are front views showing an operational state of the mobile terminal according to the embodiment of the present invention shown in FIG. 6. As shown in FIG. 7A, when the mobile terminal is switched from a closed state to an opened state, the first display unit 250 displays first information 281 including icons 282, 283, 284 and 285 related to different operational modes. In this embodiment, four icons are displaying including a phone icon 282 representing a phone mode, a message icon 283 representing a text message mode, a memo icon 284 representing a typing mode, and a music icon 285 representing a music listening (or video watching) mode. Further, the second information includes key information related to the phone mode and the text message mode (similar to the features shown in FIGS. 5B and 5C). The operations related to the phone mode, text message mode, and typing mode are performed in the same manner as in the previous embodiment.

Figure 7B:
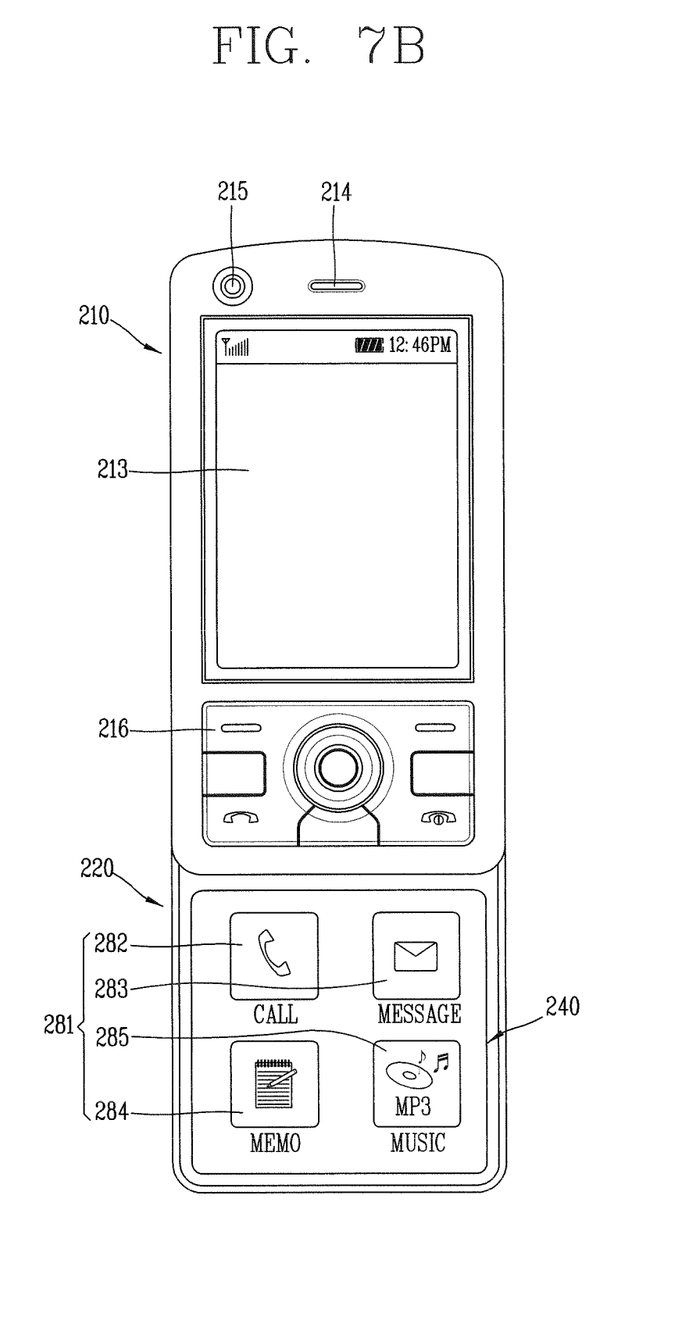

FIG. 7B illustrates third information 286 including information related to the music listening mode being displayed. As shown in FIG. 7B, when the user touches the icon 285 in FIG. 7A representing the music listening mode, the third key display unit 280 displays the third key information 286. The third key information 286 includes a plurality of play keys related to the playing of music. The user may thus input information related to the playing of music by pushing the plurality of play keys.

In addition, the above description describes a slide type mobile terminal, but embodiments of the present invention can also be applied to various types of mobile terminals including a bar type, a folder type, a swing type, and a swivel type. Further, the above description describes a keypad assembly related to the present invention having two or three display units. However, the keypad assembly may have a greater number of display units.

Figure 8:
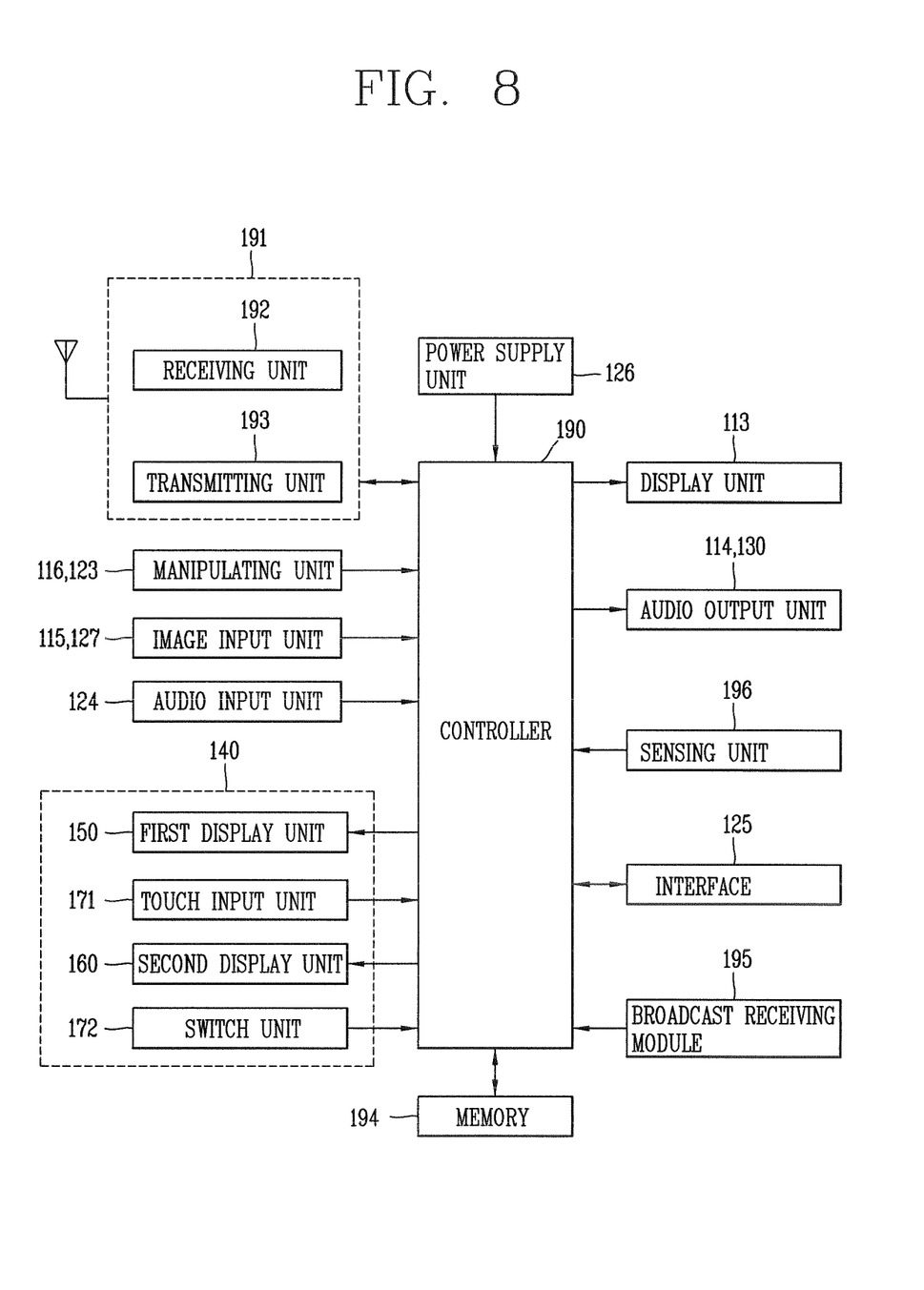
FIG. 8 is a block diagram of a mobile terminal according to an embodiment of the present invention.

Next, FIG. 8 is a block diagram of a mobile terminal according to an embodiment of the present invention. Elements in FIGS. 1-3 will also be referred to throughout this description. As shown in FIG. 8, the mobile terminal includes a wireless communication module 191, the manipulating units 116 and 123, the image input units 115 and 127, the audio input unit 124, the display unit 113, the audio output units 114 and 130, a sensing unit 196, the interface 125, a broadcast receiving module 195, a memory 194, the power supply unit 126, and a controller 190.

The controller 190 generally controls the overall operation of the mobile terminal such as controlling and processing information related to a voice call, data communication, a video call, or the like. The controller 190 also controls the operations according to the embodiments described above. For example, the controller 190 controls the operation of the first, second and/or third display units of the keypad assembly 140. For example, when the controller 190 applies a corresponding signal to the first display unit 150, the first display unit 150 displays the first information 181.

In addition, when the user touches the first information 181, the touch input 171 detects the touch and applies the corresponding signal to the controller 190. The controller 190 then deactivates the first display unit 150 and activates the second display unit 160. Further, the controller 190 controls the second display unit 160 to display the second information 185. In addition, when the user touches and pushes the second information 185, the switch unit 172 applies the corresponding signal to the controller 190.

Further, the wireless communication module 191 transmits/receives radio signals to/from a mobile communication base station via an antenna. For example, the wireless communication module 191 handles transmission/reception of audio data, text data, video data, and controls data under the control of the controller 190. The wireless communication module 191 also includes a transmitting unit 193 that modulates a signal to be transmitted and transmits the modulated signal and a receiving unit 192 that demodulates a received signal.

In addition, the manipulating units 116 and 123 may be configured as shown in FIG. 1 to provide key input data input by the user to the controller 190 to control the operation of the terminal. Each of the manipulating units 116 and 123 may also be formed as a dome switch, a touch pad (e.g., static pressure/capacitance), a jog wheel, a jog switch, and the like. Further, the image input units 115 and 127 process an image frame such as a still image or video obtained by an image sensor during a video calling mode or in an image capturing mode. The processed image frames are then converted into image data that can be displayed on the display unit 113 and then output to the display unit 113. The image frame processed by the image input units 115 and 127 may also be stored in the memory 194 or transmitted to the exterior via the wireless communication module 191 under the control of the controller 190.

Also, the audio input unit 124 such as a microphone receives an external audio signal in a calling mode, recording mode, voice recognition mode, etc., and processes the signal into electrical voice data. In the calling mode, the processed voice data is converted and output into a format that can be transmitted to the mobile communication base station via the wireless communication module 191. In the recording mode, the processed voice data is stored in the memory 194. The audio input unit 124 may also include assorted noise canceling algorithms to cancel noise generated in the course of receiving the external audio signal.

In addition, the display unit 113 (e.g., the fourth display unit) displays and outputs information processed in the mobile terminal. For example, when the mobile terminal is in a calling mode, the display unit 13 displays a User Interface (UI) or a Graphic User Interface (GUI) related to a call under the control of the controller 190. When the mobile terminal is in a video calling mode or an image capturing mode, the display unit 113 displays a captured/received image, UI, and/or a GUI under the control of the controller 190. If the display unit 113 includes a touch screen, the display unit 113 may be also used as an input unit as well as the output unit.

Further, the audio output units 114 and 130 output audio data which has been received from the wireless communication module 191 in a call signal reception mode, a calling mode, a recording mode, a voice recognition mode, a broadcast reception mode, or the like, and output audio data which has been stored in the memory 194. In addition, the audio output units 114 and 130 output an audio signal related to a function (e.g., a call signal reception sound, a message reception sound, or the like.) performed by the mobile terminal.

The sensing unit 196 senses a current state of the mobile terminal such as an opened or closed state of the mobile terminal, a location of the mobile terminal, or whether or not the mobile terminal is being touched by the user, and generates a sense signal for controlling the operation of the mobile terminal. For example, when the mobile terminal is a slide phone, the sensing unit 196 can sense whether the slide phone is opened or closed and output the sensing result to the controller 190 to control the operation of the terminal. In addition, the sensing unit 196 handles a sensing function as to whether or not the power supply unit 126 supplies power and whether or not the interface unit 125 is combined with an external device.

Further, the interface 125 serves to interface with external devices connected with the mobile terminal. For example, the external devices may include a wired/wireless headset, an external charger, a wired/wireless data port, a card socket (e.g., for coupling a memory card, a SIM/UIM card), and the like. The interface 125 may receive data from the external device or be provided with power and transfer the received data or power to each element of the mobile terminal. The interface 125 can also transmit internal data of the mobile terminal to an external device.

In addition, the memory 194 can store a program for processing and controlling performed by the controller 190, and temporarily store input or output data (e.g., a phone book, a message, a still image, or video, or the like). The memory 194 can also store a program for controlling an operation of the mobile terminal related to embodiments of the present invention. The memory 194 may include a storage medium, such as a hard disk type memory, a card type memory (e.g., an SD or XD memory, or the like.), a flash memory, a RAM, or a ROM.

Further, the broadcast receiving module 195 receives a broadcast signal transmitted through a satellite or terrestrial waves, converts the signal into a broadcast data format that can be output to the audio output units 114 and 130 and the display unit 113, and outputs the converted information to the controller 190. In addition, the broadcast receiving module 195 receives supplementary data (e.g., Electric Program Guide (EPG), a channel list, or the like) associated with a broadcast. The broadcast data converted in the broadcast receiving module 195 and the supplementary data can also be stored in the memory 194. In addition, the power supply unit 126 receives external or internal power and supplies power required for an operation of each element under the control of the controller 190.

As described above, embodiments of the present invention can implement various key input modes using a single structure capable of selectively inputting first and second information when each of the first and second information is selectively displayed on the first and second display units. Furthermore, the embodiments of the present invention provide a structure having various input methods as a single structure capable of inputting information or commands by the user performing a touching or pushing action.

In addition, key information varied in accordance with a mode can be displayed through a simple structure by implementing the first and second display units using first and second light emitting devices and first and second light guide films. A more convenient user interface environment can also be implemented by providing a structure in which icons representing selectable operation modes are selected by touching and key information corresponding to the operation modes are input by pushing.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims. All or part of the embodiments may be selectively combined to realize various modifications.

What is claimed is:

1. A mobile terminal, comprising:
 a first display unit configured to display first information for selecting a first key function;
 a second display unit configured to display second information for selecting a second key function, said second display unit being disposed to overlap with one surface of the first display unit,
 a touch input unit configured to receive a touch input for receiving an instruction for selecting the first or the second key function upon activation of the first or second display unit; and
 a controller configured to control the second display unit to display the second information upon deactivation of the first display unit,
 wherein the first unit comprises:
 a first light emitting device configured to emit light in a first direction; and
 a first light guide film having a first print pattern to display the first information, and configured to guide the light emitted from the first light emitting device to the first print pattern,
 wherein the second display unit comprises:
 a second light emitting device configured to emit light in a second direction different from the first direction; and
 a second light guide film having a second print pattern to display the second information, and configured to guide the light emitted from the second light emitting device to the second print pattern, said second light guide film being disposed to overlap one surface of the first display unit, and
 wherein the first and second print patterns overlap each other in the single display region, and one of the first and second light emitting devices is deactivated while another of the first and second light emitting devices is activated such that the first information and second information are selectively displayed on the single display region.

2. The mobile terminal of claim 1, wherein the first and second print patterns are formed with fluorescent ink that emits light upon receiving the light emitted by the first and second light emitting devices, respectively.

3. The mobile terminal of claim 1, wherein the second light guide film is positioned on a rear surface of the first light guide film.

4. The mobile terminal of claim 3, further comprising a deposition layer formed on the rear surface of the first light guide film, and for reducing the luminance of light emitted from the second print pattern so as to prevent the first print pattern from being displayed by the light emitted from the second print pattern.

5. The mobile terminal of claim 4, further comprising a diffusion layer formed on a rear surface of the deposition layer, and for diffusing the light of the second print pattern.

6. The mobile terminal of claim 1, further comprising:
 light blocking members mounted on the first and second light emitting devices and configured to force light emitted by the first and second light emitting devices to only reach the first and second light guide films.

7. The mobile terminal of claim 1, wherein the touch input unit is configured to receive an instruction for activating the first or second key function by touching around the first or second information.

8. The mobile terminal of claim 7, further comprising a switch unit for receiving a push operation according to the touch input.

9. The mobile terminal of claim 8, wherein the mobile terminal further comprises a printed circuit board positioned on a rear surface of the first or second display unit, and
 the touch input unit and the switch unit are disposed on the printed circuit board.

10. The mobile terminal of claim 9, wherein the touch input unit includes a pressure sensor or touch pad disposed on a front surface of the printed circuit board.

11. The mobile terminal of claim 9, wherein the switching unit includes a dome switch disposed on a rear surface of the printed circuit board.

12. The mobile terminal of claim 9, wherein the printed circuit board includes a flexible printed circuit board on which a pushed region of the second key information is deformed.

13. The mobile terminal of claim 1, wherein the first information includes a plurality of icons for selecting a plurality of operation modes, and
 the second information includes key information corresponding to the plurality of operation modes.

14. The mobile terminal of claim 13, wherein the operation modes include a telephone number input mode and a character input mode, and
 the second information includes at least one of numbers, characters, and symbols arranged in plural number.

15. The mobile terminal of claim 13, wherein the operation modes include a typing mode for inputting text by touching, and
 the touch input unit receives a text input in a state that the first and second display units are deactivated.

16. The mobile terminal of claim 13, wherein the operation modes include a video or music play mode, and
 the second information includes a plurality of play keys related to the playing of video or music.

17. The mobile terminal of claim 1, wherein the mobile terminal further comprises a third display unit for displaying a third information for selecting a third key function upon deactivation of at least one of the first and second display units, and
 the touch input unit is configured to receive an instruction for selecting the third key function upon activation of the third display unit.

18. The mobile terminal of claim 1, wherein the mobile terminal further comprises:
 a first body having a fourth display unit; and
 a second body slidably connected to the first body,
 wherein the first and second display units are installed on the second body.

19. The mobile terminal of claim 1, further comprising a plurality of display units configured to display a plurality of information for selecting key functions upon the deactivation of the non-selected key display units,
 wherein the touch input unit is further configured to receive an instruction for selecting the selected key function upon activation of the selected display unit.

20. The mobile terminal of claim 1, further comprising:
 a first body and a second body, said second body containing the first and second display units and said first body being disposed to slidably overlap with the second body to define both an opened and closed configuration.

21. The mobile terminal of claim 1, wherein the first light emitting device and the second light emitting device are mounted on the same surface.

* * * * *